(12) United States Patent  
Kunieda et al.

(10) Patent No.: US 7,035,444 B2  
(45) Date of Patent: Apr. 25, 2006

(54) SYSTEM FOR FINGERPRINT AUTHENTICATION BASED OF RIDGE SHAPE

(75) Inventors: Hiroaki Kunieda, 12-28, Enzo 1-chome, Chigasaki-shi, Kanagawa (JP); Tsuyoshi Isshiki, Tokyo (JP); Dongju Li, Tokyo (JP); Tomohiko Otsuka, Tokyo (JP); Mohamed Mostafa, Tokyo (JP)

(73) Assignee: Hiroaki Kunieda, Kanagawa (JP)

( * ) Notice: Subject to any disclaimer, the term of this patent is extended or adjusted under 35 U.S.C. 154(b) by 512 days.

(21) Appl. No.: 09/972,200

(22) Filed: Oct. 9, 2001

(65) Prior Publication Data

US 2002/0071598 A1   Jun. 13, 2002

(30) Foreign Application Priority Data

Oct. 11, 2000   (JP) .............................. 2000-310265

(51) Int. Cl.  
*G06K 9/00* (2006.01)

(52) U.S. Cl. ..................................... 382/125; 340/5.83

(58) Field of Classification Search ........ 382/115–127; 300/383–384; 340/5.52–5.53, 5.81–5.84; 396/15; 902/3; 283/68–69  
See application file for complete search history.

(56) References Cited

U.S. PATENT DOCUMENTS

| 4,135,147 | A | * | 1/1979 | Riganati et al. ............ 382/125 |
| 4,817,183 | A | * | 3/1989 | Sparrow ..................... 382/125 |
| 5,337,369 | A |   | 8/1994 | Shibuya |
| 5,454,070 | A | * | 9/1995 | Donelly et al. ............. 345/589 |
| 5,465,303 | A | * | 11/1995 | Levison et al. ............. 382/124 |
| 5,828,773 | A | * | 10/1998 | Setlak et al. ................ 382/126 |
| 5,974,163 | A | * | 10/1999 | Kamei ........................ 382/125 |
| 6,241,288 | B1 | * | 6/2001 | Bergenek et al. ............. 283/67 |
| 6,263,091 | B1 | * | 7/2001 | Jain et al. ................... 382/125 |
| 6,314,196 | B1 | * | 11/2001 | Yamaguchi et al. ......... 382/125 |
| 6,487,306 | B1 | * | 11/2002 | Jain et al. ................... 382/125 |

FOREIGN PATENT DOCUMENTS

| EP | 0 339 527 A2 | 11/1989 |
| EP | 0 965 817 A1 | 12/1999 |
| GB | 1 577 797 | 10/1980 |

OTHER PUBLICATIONS

Maio et al.; "Direct Gray-Scale Minutiae Detection in Fingerprints", IEEE Transactions on Pattern Analysis and Machine Intelligence, IEEE Inc., New York, USA, vol. 19, No. 1, 1997, pp. 27-40, XP000682681.

(Continued)

*Primary Examiner*—Vikkram Bali  
*Assistant Examiner*—Colin LaRose  
(74) *Attorney, Agent, or Firm*—Berenato, White & Stavish, LLC

(57) ABSTRACT

A system comprising means, which stores, regenerates, or matches shape of curves, by using a specified group of data in length to express a shape of curve. The system uses a sequence of several measure points on the curve, which are determined so as to make the same distances between those adjacent measure points. They are the data of lengths of arcs between starting measure point and ending measure points among every three consecutive measure points on the curve.

15 Claims, 13 Drawing Sheets

Derivation of numerical data of minutia ridge shape

OTHER PUBLICATIONS

Rodriguez et al., "3D-Curve Similarity Using Fuzzy String Matching", Fuzzy Systems, 1997, Proceedings of the Sixth IEEE International Conference on Barcelona, Spain Jul. 1-5, 1997, New York, USA, IEEE, US, Jul. 1, 1997, pp. 79-82, XP010241888.

Qinghan Xiao et at., "Fingerprint Image Postprocessing: A Combined Statistical and Structural Approach", Pattern Recognition, Pergamon Press Inc., Elmsford, NY, USA, vol. 24, No. 10, 1991; pp. 985-992, XP000243560.

Braul J-J el al., "A Complexity Measure of Handwritten Curves: Modeling of Dynamic Signature Forgery", IEEE Transactions of Systems, Man and Cybernetics, IEEE Inc., New York, USA, vol. 23, No. 2; Mar. 1, 1993, pp. 400-412; XP000398703.

Farina et al., "Fingerprint Minutaie Extraction from Skeletonized Binary Images", Pattern Recognition, Pergamon Press Inc., Elmsford, NY, USA, vol. 32, No. 5, May 1999, pp. 877-889, XP004222753.

* cited by examiner

Derivation of numerical data of minutia ridge shape

Curve to be recognized moves and rotates

Principle of calculating approximate coordinates of measure points located between pixels FIG.7
False feature point
(a) Two ending minutia close to each other, which posses the same directions as their minutia ridge shapes
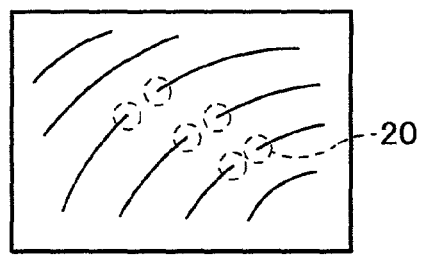
(b) Ending minutia near a bifurcation point
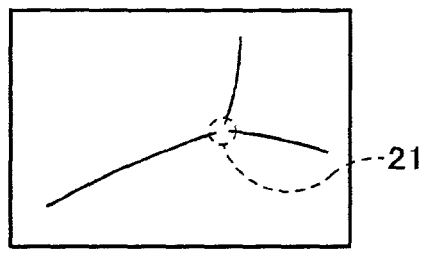
(c) Ending minutia near boundary of image
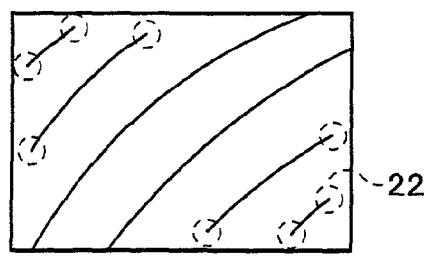

FIG.8
Extraction of minutia by thinning and reverse operations between black and white over black
(a) Black and white image before treatment
Thinning →
(b) Intermediate extracted minutia
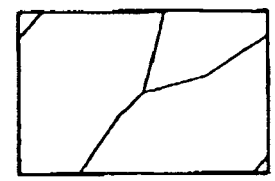
Reverse operation ↓
(c) Black and white reversal image
Thinning →
(d) Extracted minutia after final treatment
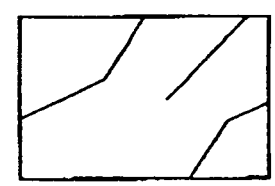

Judgment of removal of false minutia utilizing scalar product

Algorithm of feature extraction for recognition system by use of raster scan image capture Algorithm for finger authentication system

SYSTEM FOR FINGERPRINT AUTHENTICATION BASED OF RIDGE SHAPE

BACKGROUND OF THE INVENTION

1. Field of the Invention

The present invention relates to a system for fingerprint authentication provided to extract minutia ridge shapes by using simple data format to recognize curves and to provide fast and effective mechanism with less memory space and computation complexity.

2. Description of the Prior Art

One type of prior art fingerprint authentication systems is to extract position of minutiae, which are points of ridge endings and bifurcations, in fingerprint images for both templates and an input sample. Matching or verification is performed between extracted data of input sample and template. Since fingerprint images of the input sample and template differ in their position, rotation angle and noise environment, matching operation has large computational complexity such as compensation of shifting and rotation, and false minutia elimination. Main reason for difficulties in prior art comes from adoption of absolute measure, such as position of minutia, which is sensitive against shifting, rotation and noise.

SUMMARY OF THE INVENTION

The present invention is directed to a curve recognition system and its application to fingerprint authentication based on ridge shape information. The system of the present invention uses small size data format for curves on discrete grids, and relative measure robust against shifting, rotation and noise. The invention provides fast and accurate fingerprint authentication algorithm and hardware system with small data storages of 50 bytes. Several important techniques are included in the invention such as secondary minutia, criteria for true or false minutia, treatment of shifted and rotated fingerprint input, pipeline parallel processing within 0.24 seconds for raster scan image capture and feature extraction processing, and several useful applications such as on-line verification.

BRIEF DESCRIPTION OF THE DRAWINGS

FIG. 7 illustrates false minutia, which consists of:
(a) two ending minutia close to each other, which posses the same directions as their minutia ridge shapes;
(b) an ending minutia near a bifurcation point;
(c) an ending minutia near boundary of image;

FIG. 8 illustrates process of both reverse of black and white and thinning;

DESCRIPTION OF THE PREFERRED EMBODIMENT

Figure 1:
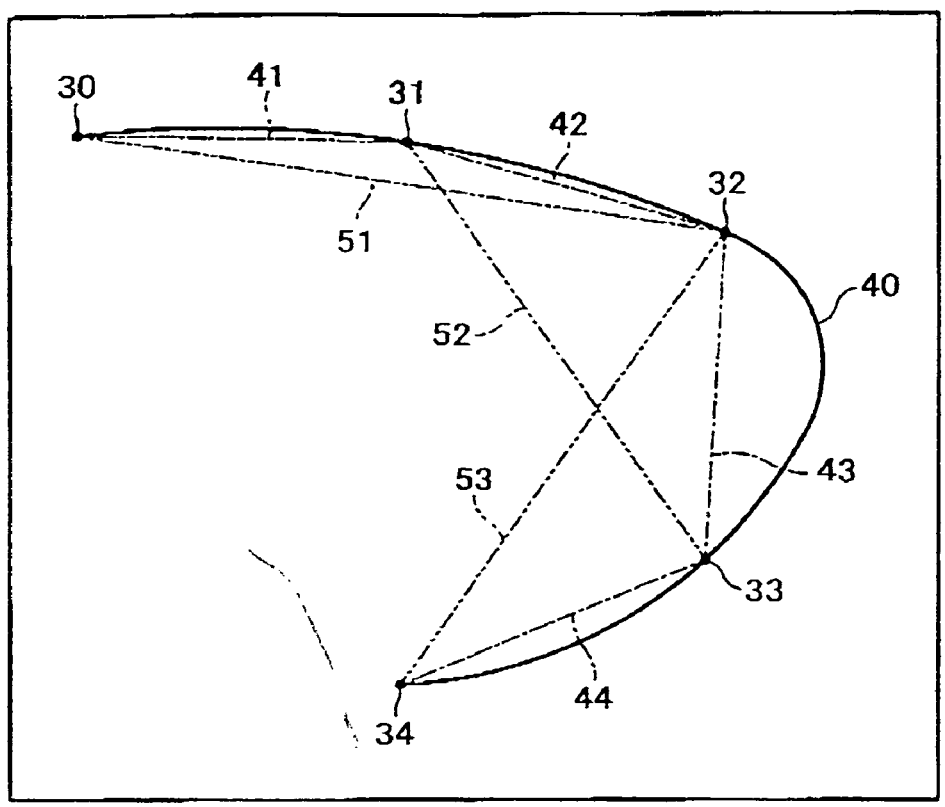
FIG. 1 illustrates derivation of numerical data to express information of minutia ridge shape.

FIG. 1 illustrates derivation of numerical data to express information of minutia ridge shape. Minutia is a special point on a ridge of fingerprints, whether the ridge is terminated at the point or ridge is bifurcated at the point. The former minutia is called an ending minutia, while the latter is called a bifurcation minutia. Minutia ridge is a ridge departing from any kinds of minutia. Consider a minutia ridge, which is smooth curve, or ridge, 40 leaving from a minutia 30 as shown in FIG. 1.

Sampling points (called measure points, hereafter) 31, 32, 33 and 34 on the ridge are taken in such a way that chords 41, 42, 43 and 44 between measure points become unit lengths. This is in a way similar to measuring a length of a curve in a map by use of a divider.

Based on the chords, a length of a chord 51 is measured as a feature, which becomes a chord of a triangle comprised by the first and the second measure points 31 and 32, and the minutia 30.

Actually, the measure points 31, 32 and 33 are decided by measuring unit length from previous measure point along the ridge 40, one by one. The length of the chord from each measure point to its next measure point is measured. As an example, the chord 51 from the minutia 30 to the second measure point 32 is measured, the chord 52 from the first measure point 31 to third measure point 33 is measured, and the chord 53 from the second measure point 32 to the fourth measure point 34 is also measured.

As a result of this measurement, the numerical length data of the chords 51, 52 and 53 are used as information to express the minutia curve shape of the curve 40. These simple numerical data become fingerprint feature data.

By use of matching these fingerprint feature data with content of database (called template, hereafter) registered in advance, the system achieves fast matching and high recognition rate with a few memory in data size.

Figure 2:
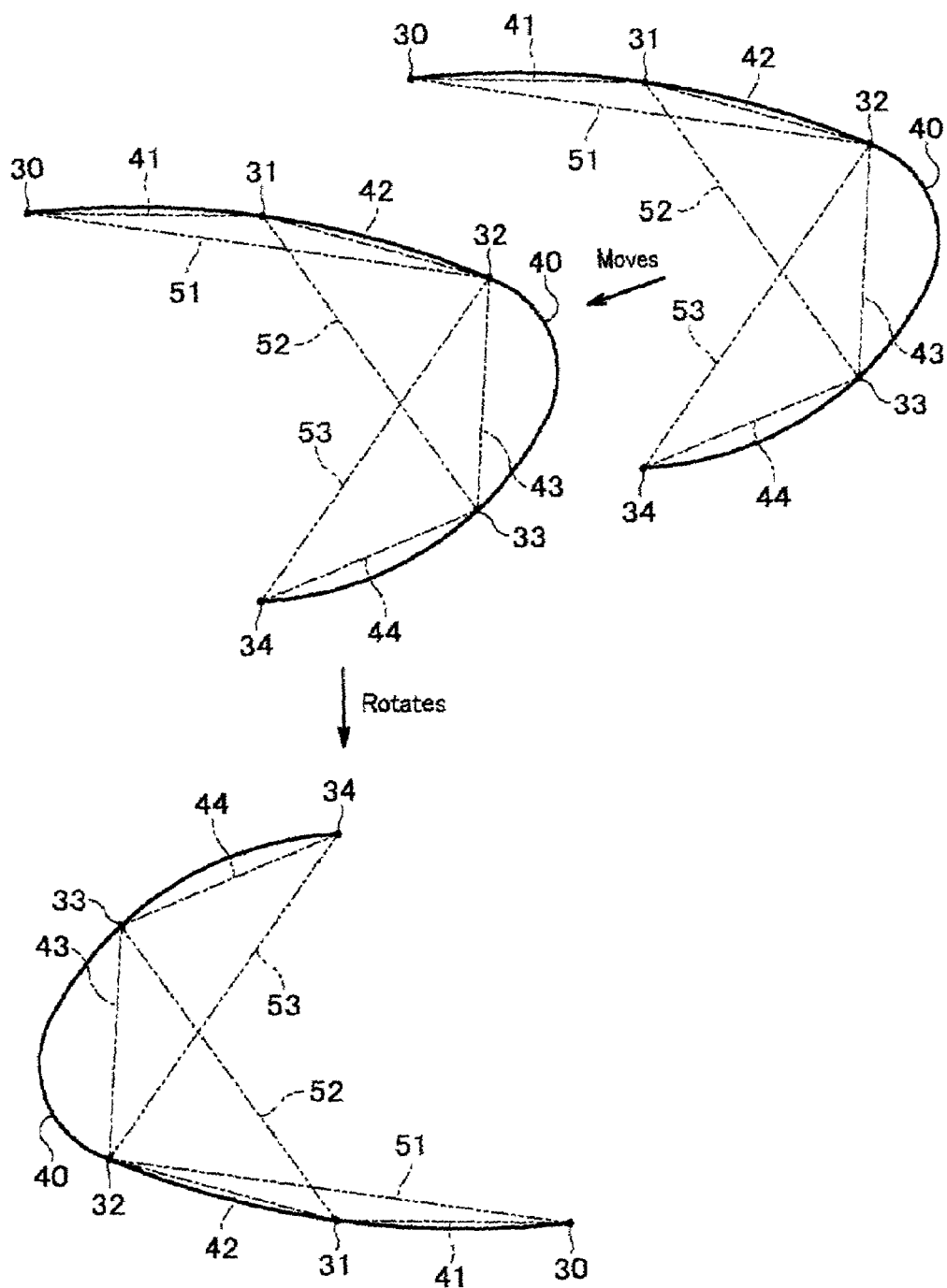
FIG. 2 illustrates the movement and rotation of the image to be recognized.

Consider the input fingerprint image, in which the curve 40 moves and rotates as shown in FIG. 2. If shape of the curve 40 is expressed by the numerical data such as lengths of the chords 51, 52 and 53, they do not change against any move and any rotation of the curve 40. Therefore, the numerical data such as the lengths of the chords 51, 52 and 53 can be recognized, stored, regenerated and distinguish shape of the curve 40 from an original curve. Matching or verification of shape of curve can be detected by comparing those numerical data.

Figure 3:
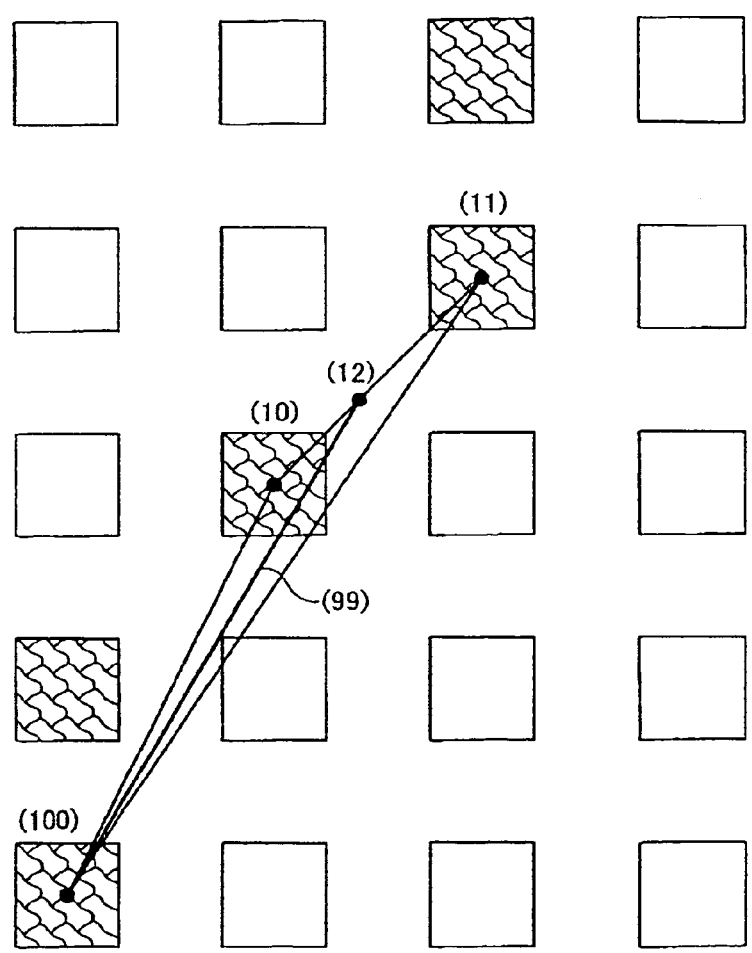
FIG. 3 illustrates the principle of calculating approximate coordinates of measure points located between pixels.

FIG. 3 illustrates the principle of calculating approximate coordinates of measure points located in a grid. The grid is in the form of an array of pixels in a digital image captured by digital camera or video deck. The grid is comprised by a certain number of the pixels, which react to the light similarly to retina of human eyes. The pixels are placed regularly with a certain period over the rectangular grid.

In the case of digital image processing on computers, image data are represented by values on the pixels, which lie over rectangular grids as shown in FIG. 3. Among those pixels, tinted pixels are one to represent a curve.

Therefore, a measure point 12, which is expected to be 4 pixels far from a standard pixel 100 on the curve, may not be on an actual pixel. In this case, location of the measure point 12 must be calculated by location of 2 pixels 10 and 11 on the curve, which are the closest pixels to the measure point 12 and 4 pixels far from the pixel 100. As an example, location of the measure point is calculated by the simple linear interpolation between the location of a first pixel 10 and location of a second pixel 11. In this way, lengths of the chords 51, 52 and 53 are obtained by using the measure point 12, whose location is not different from location of the pixels.

The present invention includes an algorithm to calculate the measure point 12 on the curve 40, which is located a specified distance from a point on the curve 40. This algorithm enables to deal with images of infinite resolution theoretically, if the location between two pixels is calculated in the image field of a finite resolution.

Consider a triangle consisting of a standard pixel and 2 closest pixels 10 and 11 on the curve, which are direct distance 99 far or close pixel from the standard point, respectively. Let a chord between the standard pixel 100 and the first pixel 10 denote a first chord. Let a chord between the standard pixel 100 and the second pixel 11 denote a second chord. Furthermore, let a chord between the first pixel 10 and the second pixel 11 denote a third chord. Then, a measure point on the third chord is decided in such a way that the point divides length of the third chord at the same ratio of lengths between the first and second chord. This interpolation increases the capability of curve recognition to large extent, regardless of the precision of this approximation.

Figure 4:
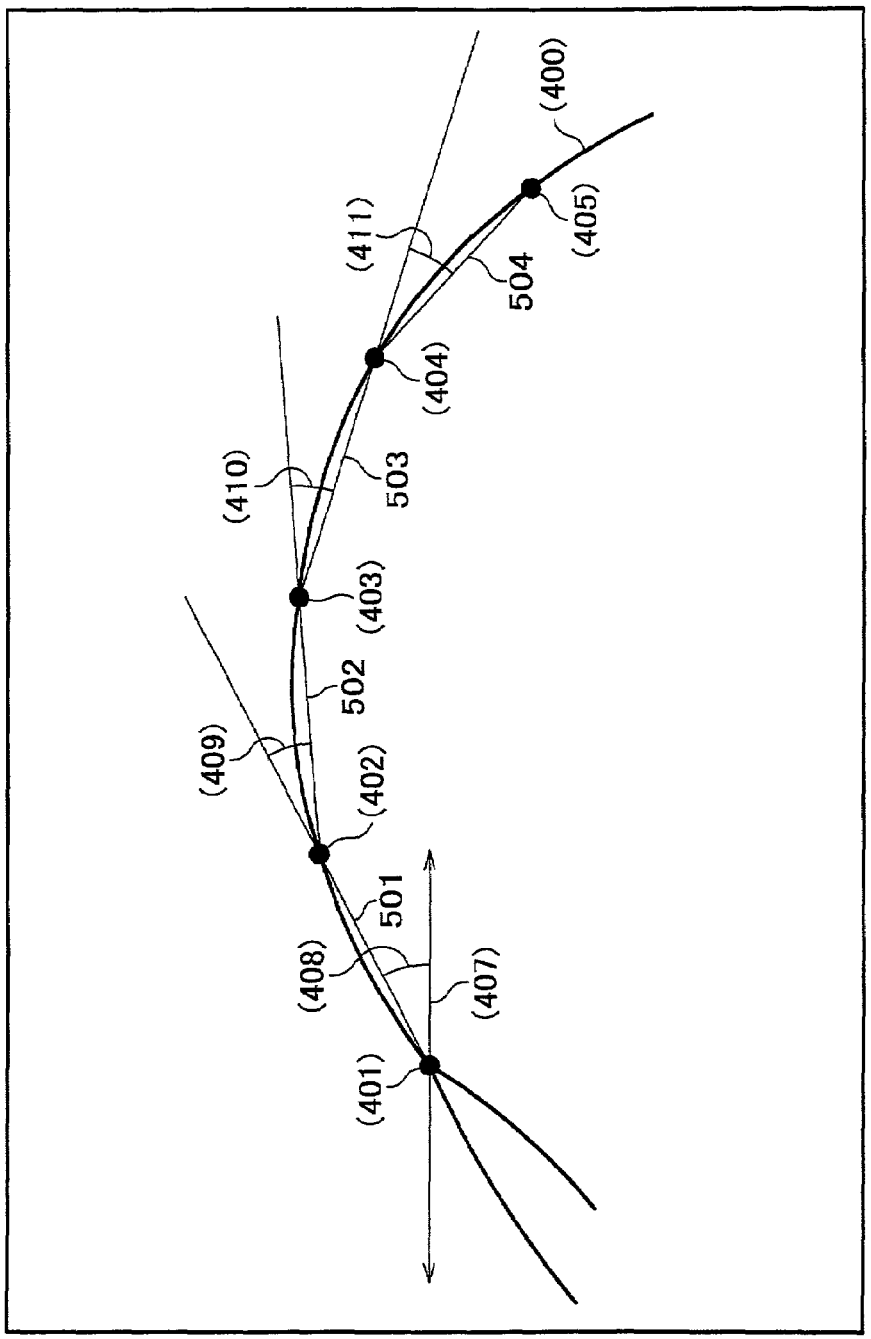
FIG. 4 illustrates another feature data to express minutia ridge shape.

FIG. 4 illustrates another feature data to express minutia ridge shape. Let's consider a minutia curve or ridge (400), which extends to reverse direction to bifurcation as shown in FIG. 4. Let a point on the ridge (400) denote "the second measure point" (402), which locates a distance D far from the first measure point (401). In similar way, we measure the $3^{rd}$ measure point (403), which locates the distance D farther than the second measure point. Then, we measure the $4^{th}$ and $5^{th}$ measure point (404) and (405), respectively. This procedure can be repeated until the ridge terminates or goes outside of boundary of image. Then, a series of chords between adjacent measure points approximates shape of the curve (400).

An effective method to express this piece-wise linear curve is to measure "directional angle", which is defined or calculated by an angle between standard axis and line connected from minutia (401) to the $1^{st}$ measure point. Then, "the first curvature" is measured, which is defined or calculated by an angle between line connected from minutia (1) to the 2nd measure point (402) and line connected from the 2nd measure point (402) to the 3rd measure point (403). Similarly, "the second curvature" is measured, which is defined or calculated by an angle between line connected from the $2^{nd}$ measure point (402) to the 3rd measure point (403) and line connected from the $3^{rd}$ measure point (403) and the $4^{th}$ measure point (404). In this way, angles are measured between adjacent lines, which are connected between measure points along the ridge. Thus, the necessary information becomes a directional angle of minutia (408) and group of curvature angles between adjacent lines (409), (410), (411).

Since the directional angle and group of curvature angles express well a ridge shape, the capability of curve recognition is greatly improved by use of the information. This expression can be applied not only to bifurcation minutia, but also to the ending minutia.

Figure 5:
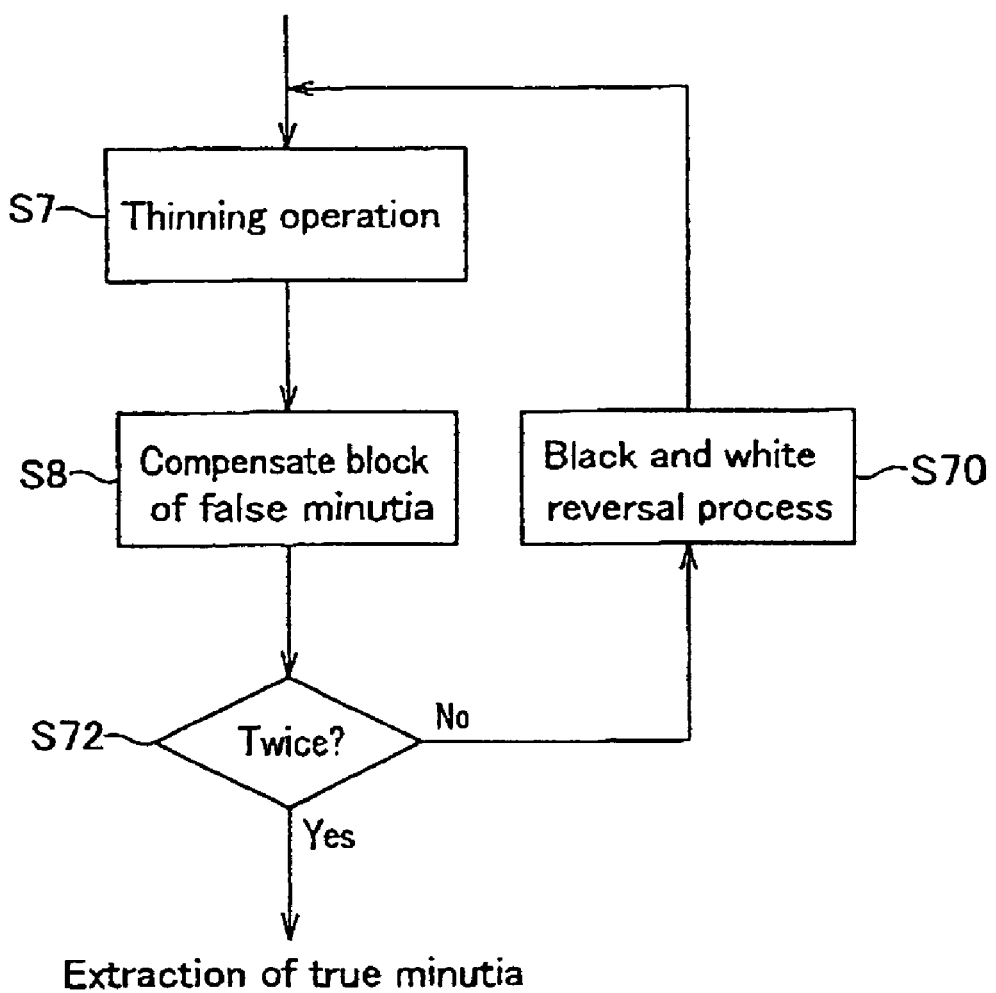
FIG. 5 illustrates an algorithm to extract true minutia by thinning operation and reverse operation between black and white over black and white binary image.

FIG. 5 illustrates an algorithm to extract true minutia by thinning operation and reverse operation between black and white over black and white binary image. The original black and white image is processed by cascade connection of thinning block (Step S7) and compensation block of false minutia (Step S8).

The contour along ridge of black object in black and white image is reduced to 1 pixel in width. Thinning is a conversion from an area to a line as shown in Step S7. More detail thinning process is described later according to FIG. 8.

The first extraction of the ending minutia in original black and white image, black and white reversal process (Step S70) and the second cascade processing over reversal image, and the second extraction of ending minutia in reversal image can be performed without extracting both ending and bifurcation minutia. This is also described in detail according to FIG. 8.

This process makes the algorithm more suitable, faster and more accurate to treat huge number of templates and samples without using large memory area and with simple hardware.

Figure 6:
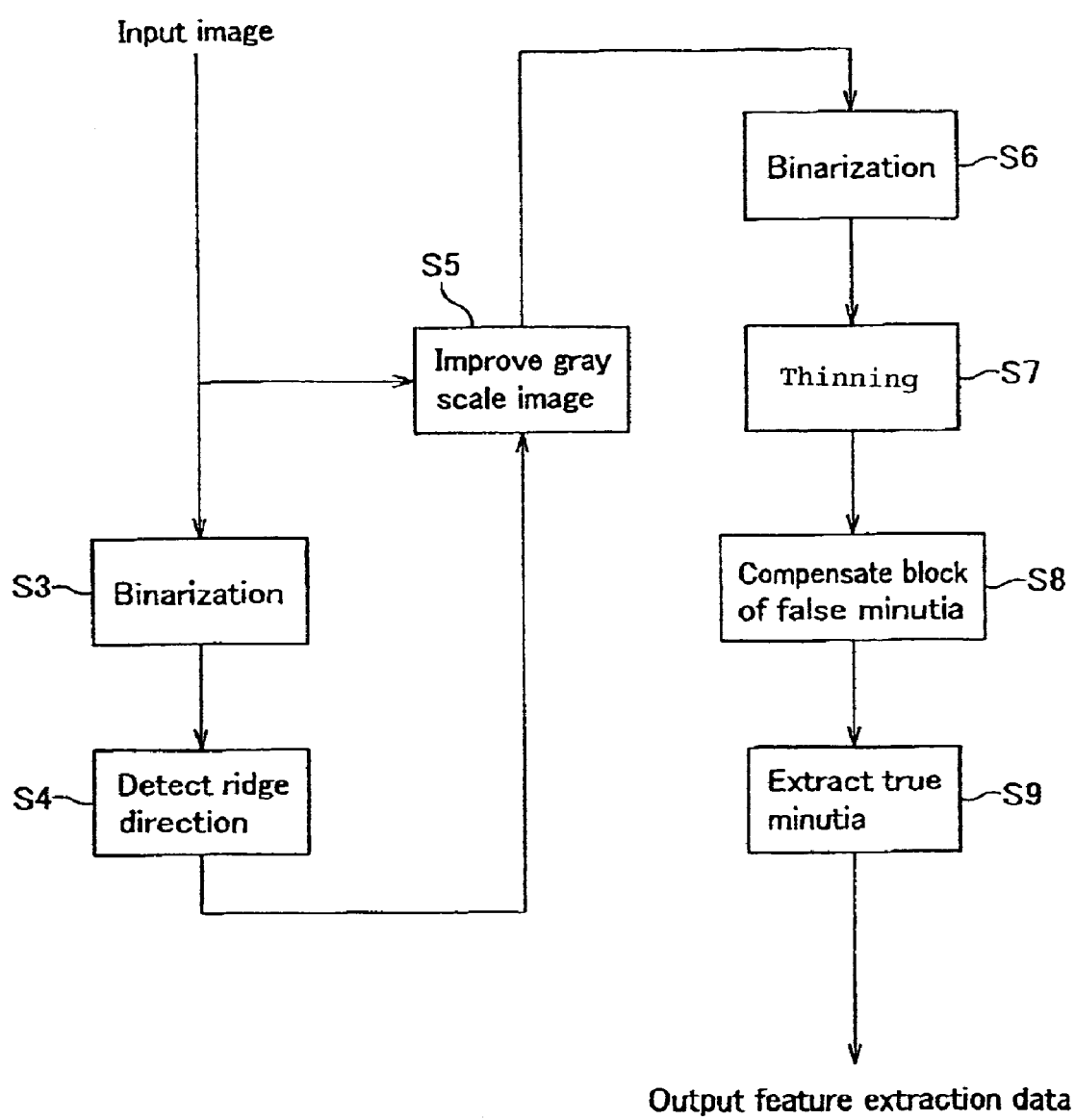
FIG. 6 illustrates algorithm for extraction of true minutia including improvement of gray scale image.

FIG. 6 illustrates an algorithm for extraction of true minutia including improvement of gray scale image. Contrast of a block, partitioned by block partitioning, is enhanced until it becomes binary image of black and white. This is the first binarization step. Then, a ridge direction is calculated by ridge direction detection.

This ridge direction is used as a secondary information in eliminating noise component. Image information along ridge direction is judged as a valid information of ridge, while image information not along ridge direction is considered as a noise. This process is called as improvement of gray scale image.

Here, Binarization is a process to convert 8 bit gray scale data into 2 bit black and white data.

FIG. 7 illustrates a false minutia, which consists of:

(a) two ending minutiae (20) close to each other, which posses the same directions as their minutia ridge shapes;

(b) an ending minutia (21) near a bifurcation point; and (c) an ending minutia (22) near boundary of image.

After false minutia elimination (Step S8), which compensates noise components in the fingerprint data, the next procedure is extraction of true minutia (Step S9). Details of the true minutia extraction (Step S9) are explained as a post processing according to FIG. 7.

FIGS. 7 (a)(b)(c) illustrates 3 kinds of the false minutia described above, which are falsely recognized as the true minutia. Compensation rule for the false minutia is adopted as a post processing, which adds a ridge to connect two ending minutiae close to each other with the same direction or an ending minutia close to bifurcation point, or an ending minutia close to boundary of image.

Referring to FIG. 6 again, contrast of the improved image is enhanced up to obtain binarized image (Step S6). This binary image is derived from compressing width towards the center in thinning process (Step S7).

Thinning process (Step S7) brings an additional effect on simplifying complicated verification process.

Next, the false minutia compensation (Step S8) is performed, which adds the ridge to connect two ending minutiae 20 close to each other with the same direction, or an ending minutia 21 close to bifurcation point, or an ending minutia 22 near the boundary of the image.

In this way, true minutia extraction (Step S9) extracts remaining ending and bifurcation points as true minutia, after an above sequence of processing is applied over the input image, including compensation of the false minutia. The fingerprint verification based on this method reveals high verification rate for noisy input images.

FIG. 8 illustrates process of both reverse of black and white and thinning. In FIG. 8, (a) corresponds to black and white picture before processing; (b) corresponds to intermediate result for minutia extraction; (c) corresponds to black and white reverse (or inverted) image; and (d) corresponds to extracted minutia after the final processing.

The true minutia extraction with thinning (Step S7) and reversal of black and white image (S70) was explained by using FIG. 5. Though great reduction of image information is achieved, there still remains difficulty to digitalize bifurcation points.

Similarly, great reduction of information is achieved as shown in FIG. 8(b) and FIG. 8(a). However, there still remain critical problems, to which a unique judgment can not be applied.

Therefore, in order not to deal with bifurcation minutia, the processing as shown in FIG. 8 (a) to (c) is performed over reverse black and white image (Step S70). Then, thinning process (Step S7) as shown in FIGS. 8 (c) and (d) leads to ending of finite curve, i.e., the ending minutia instead of the bifurcation. This processing is repeated twice.

In such a way, the finite curves are extracted, which do not include any bifurcation or any intersection of rides. This scheme reduces amount of necessary information to express fingerprint, and thus, makes numerical expression easy. The numerical information becomes quite small in comparison with the original image.

In this way, fingerprint verification can be uniquely performed. Since no judgment of a human being is required, fast processing with small memory capacity and small load for database becomes possible.

Figure 9:
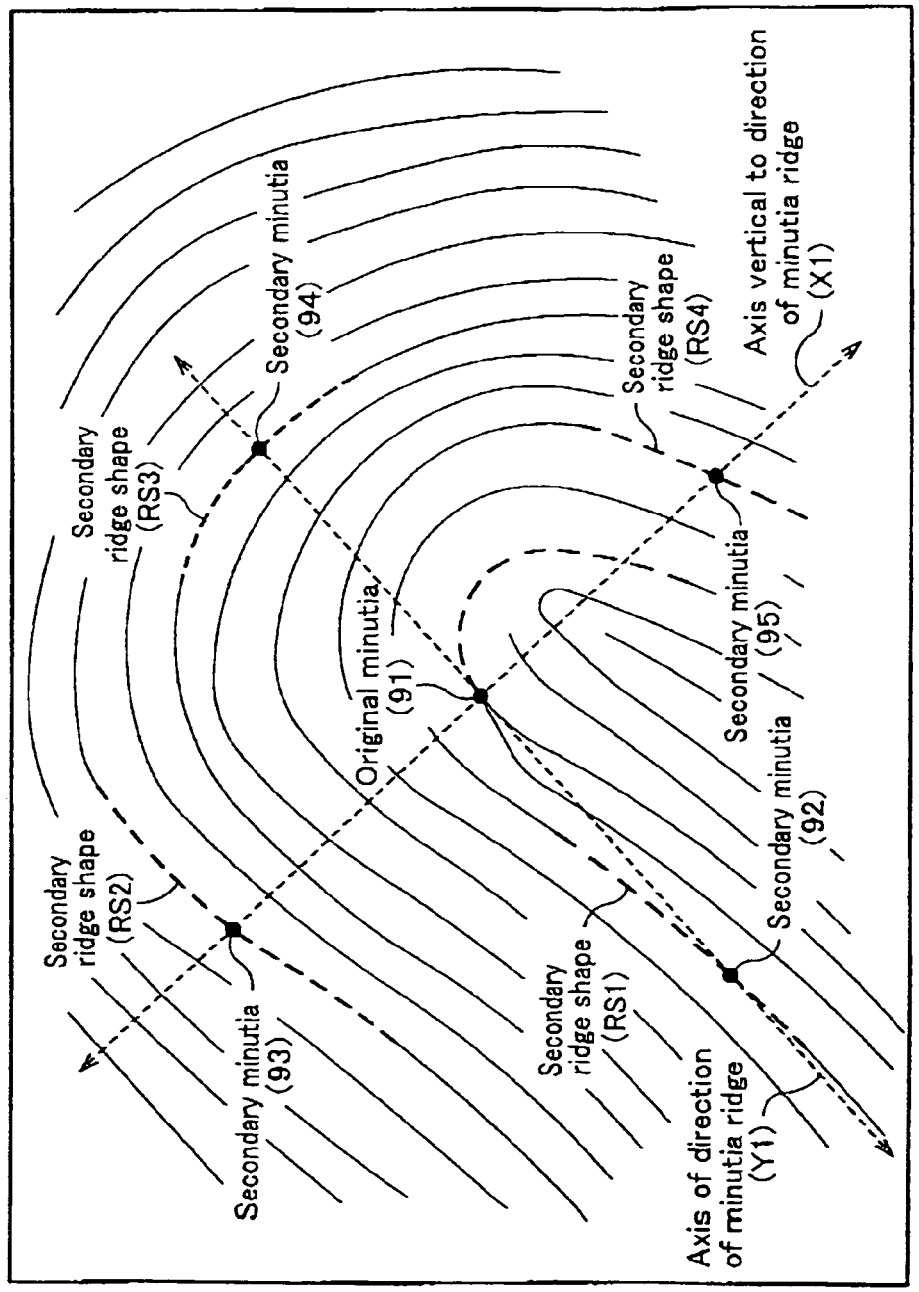
FIG. 9 is an example of describing a secondary minutia in associated with a minutia.

FIG. 9 is an example for describing a secondary minutia in associated with an original minutia (91). According to direction of minutia ridge, vertical axis (Y1) is set. Consequently, horizontal axis (X1) is determined as shown in FIG. 9. The four points (92), (93), (94) and (95) are determined on the axes in such a way that the distances between these 4 points and the original minutia (91) are equal.

The ridge shapes (RS1), (RS2), (RS3) and (RS4) leaving from the nearest point on the ridge (herein, called as "secondary minutia") to those four points are extracted by use of the curve recognition method, respectively. These ridge shapes are additional information in associated with the original minutia (91) to express features of fingerprint. The fingerprint authentication system with ridge shapes of the secondary minutia brings the tremendous improvement on precision of matching.

Figure 10:
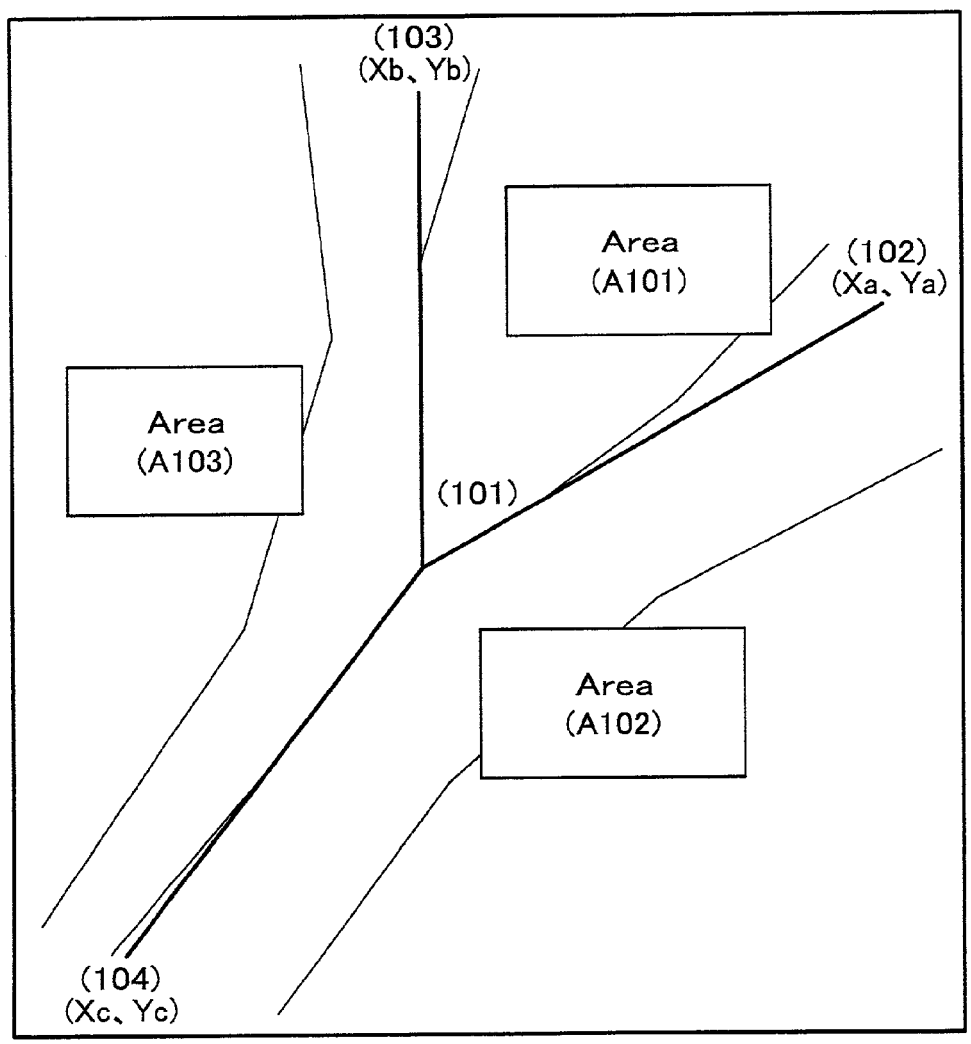
FIG. 10 is an example of detecting a false bifurcation minutia according to this invention.

FIG. 10 is an example of detecting a false bifurcation minutia in this invention. True bifurcation minutia in most cases partitions the fingerprint area into 3 parts, which consists of one acute angular area (less than 90°) (A101) and two obtuse angular areas (more than 90°) (A102) and (A103). The same things can be said for bifurcation minutia in valley. Bifurcation minutia in valley is associated with the ending minutia partitions the fingerprint area into similar 3 parts of 1 acute angular area and 2 obtuse angular areas.

This characteristic is used to judge whether a detected minutia is true or false. For this purpose, 3 points on each ridge or each valley line are selected in such a way that they are the same distance far from the bifurcation minutia. Let 3 points denote as points (102), (103) and (104), whose coordinates are (Xa, Ya), (Xb, Yb) and (Xc, Yc) respectively in coordinate system of an origin point (101).

With regards to a pair of points (102) and (103), we calculate the sum (XaXb+YaYb) of product (XaXb) of horizontal coordinate pair and product (YaYb) of vertical coordinate pair of the two points. Herein, the sum (XaXb+YaYb) is called as "an inner product of 2 points". The value of this inner product corresponds to cosine function of the angle between a line of (101)–(102) and a line of (101)–(103). It means that if the cosine value is positive, the angle between the two lines is acute (less than 90°) and if the cosine value is negative, the angle between the two lines is obtuse (more than 90°). In similar way, an inner product of two line pair of (101)–(103) and (101)–(104), and an inner product of two line pair of (101)–(102) and (101)–(104) are calculated.

The point (101) is judged as a true minutia if there exists only 1 positive inner product among these 3 inner products. This case corresponds to the situation of true bifurcation minutia, where only one acute angular area exists. Otherwise, the point (101) is judged as a false minutia.

Even if two fingerprint images of the same finger are captured by the system, positions and directions of extracted minutia are not the same. They depend on the position and angle of the finger put on an input sensor. For matching between two fingerprint images, one of the images should be compensated before comparison in the conventional method. To specify displacement and rotation and to compensate them tremendous amount of computation is deeded. In order to avoid this difficulty, usually displacement and rotation of input fingerprint image are strictly restricted. The present invention presents the matching method without compensation for displacement due to simple shifting.

Figure 11:
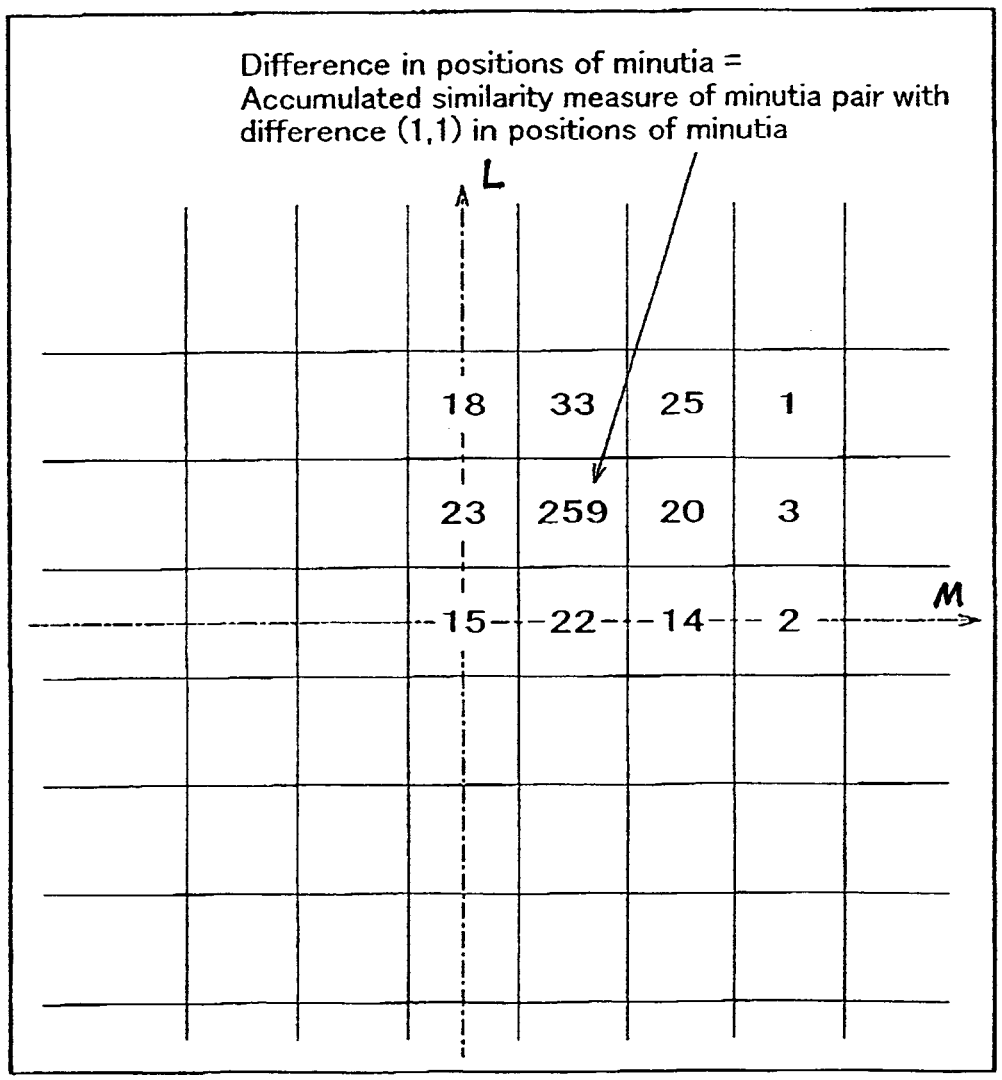
FIG. 11 represents two-dimensional memory areas of M rows and L columns.

FIG. 11 represents 2-dimensional memory areas of M rows and L columns. Before the process of fingerprint matching, the memory areas are supposed to have some initial values such as zero.

Here, consider a similarity measure of any kinds, whose numerical values correspond to how similar any pair of minutiae in two fingerprint images is. This similarity measure is calculated based on the ridge direction and a similarity of curve shape. If pair of minutiae is quite similar, a value of similarity function becomes large. On the other hand, if pair of minutiae is not so similar, a value of the similarity function becomes small.

For those two minutiae, (Xa, Ya) and (Xb, Yb) denote 2-dimensional coordinates in two fingerprint images, respectively. 2-dimensional vector (Xb-Xa, Yb-Ya) is a vector from the position of the minutia in one fingerprint image to the position of the minutia in the other fingerprint image. This means that the minutia shifted with (Xb-Xa) along horizontal direction and (Yb-Ya) along vertical direction if the former minutia matches with the latter one. If the value of similarity function between two minutia is large, the possibility of displacement (Xb-Xa, Yb-Ya) of the former fingerprint image is high. On the contrary, if the value of similarity function between two minutia in different fingerprint images is small, the possibility of displacement (Xb-Xa, Yb-Ya) of the former fingerprint image is small.

After a comparison between two minutiae in different fingerprint images, the value of similarity measure is added to the value, which is stored in memory area of (Xb-Xa, Yb-Ya) corresponding to the 2-dimensional vector (Xb-Xa, Yb-Ya). A sequence of operations is repeated for comparison between each minutia pair in different fingerprint images.

As a result, the values in the memory distribute over different addresses because of inaccuracy of position estimation of the extracted minutia. If minutia positions are accurately extracted, the strong peak value can be expected in the memory. On the contrary, in case two minutiae are produced by the different fingers, the same operation may bring the distribution of values in memory without any large peak value.

However, since to specify amount of displacement is not a final purpose, the maximum value in memory is directly evaluated. If it exceeds a certain threshold value, two input fingerprints are concluded to be identical. Otherwise, two input fingerprints are likely to be different.

The present invention gives a solution not only for shifting, but for rotation of fingerprint images by use of the matching method without using any compensation of shifting. To compensate displacement due to rotation, all the minutiae of the input fingerprint image are compensated for rotation. It should be reminded that feature data in the present invention consists of 2-dimensional coordinates and the information for minutia ridge shape. The 2-dimensional coordinates or position of minutia are compensated by rotation around a standard origin point with a certain angle. Among information for minutia ridge shape, directional angle of minutia is also compensated to the same extent. However, compensation is not necessary for curvatures of minutia ridges because they are invariant against rotation. After compensating all minutia ridge shapes with the angle, the method without compensation of shifting is applied to do matching between two fingerprint images.

Since rotation angle is not known, the above processing is repeated for different angles of rotation until a rotation angle is specified by getting the largest values in memory.

Figure 12:
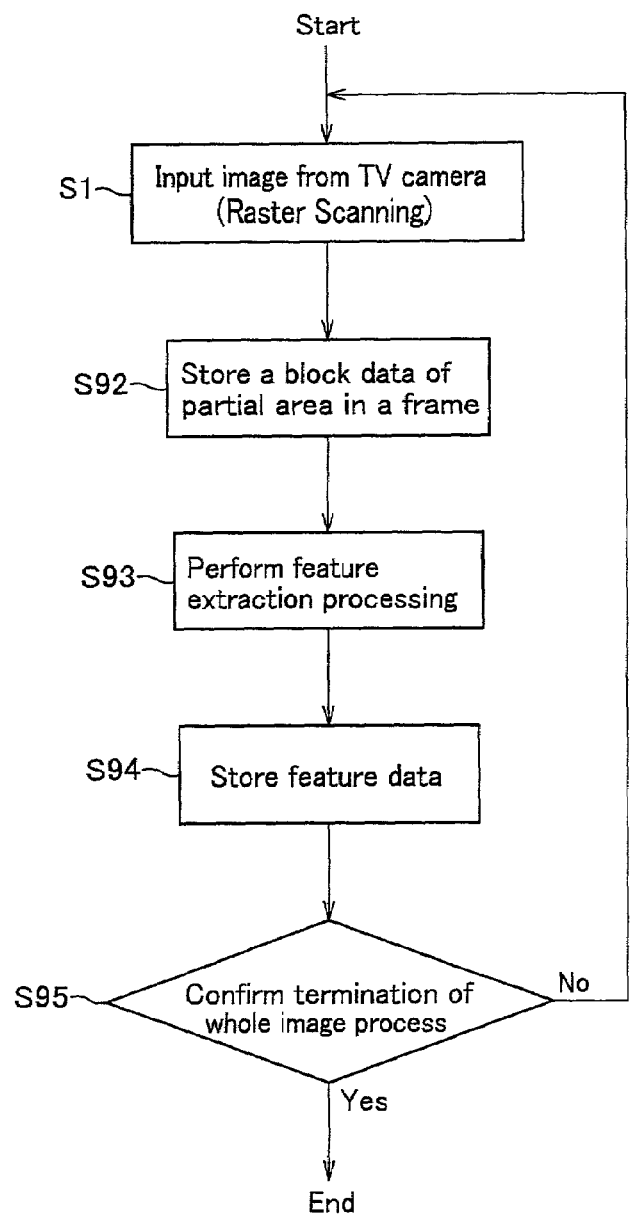
FIG. 12 illustrates algorithm of feature extraction for a curve recognition system by use of raster scan image capture.

FIG. 12 illustrates algorithm of feature extraction for recognition system by use of raster scan image capture. Camera image capture, which is similar to raster scan TV set, sends one frame data in a certain period of time to a Digital Signal Processor (hereafter, called as DSP). Camera scans sequence of frames at a certain frame rate such as 25 or 30 frames per second. In each frame, a block data of partial area in a frame is stored (Step S92). Then, feature extraction processing (Step S93) is performed in limited short time as shown in FIGS. 5 and 6.

Feature extraction processing (Step S93) is performed by a computer, which executes 1 million instructions per second. Assuming that fingerprint feature data of 50 bytes is assigned to the computer, it takes about 0.24 second for feature extraction (Step S93) and its storage (Step S94). The verification time corresponds to time for 6 or 7 frames in raster scan system of 25 or 30 frames per second.

Actually, consecutive 5, 6 or 7 frames are required under the assumption that input fingerprint images are identical among those frames. Feature extraction (Step S93) and storage of feature data (Step S94) for whole fingerprint image completes within raster scan time for 5, 6 or 7 frames. Then, termination of whole image processing (Step S95) concludes the algorithm.

Figure 13:
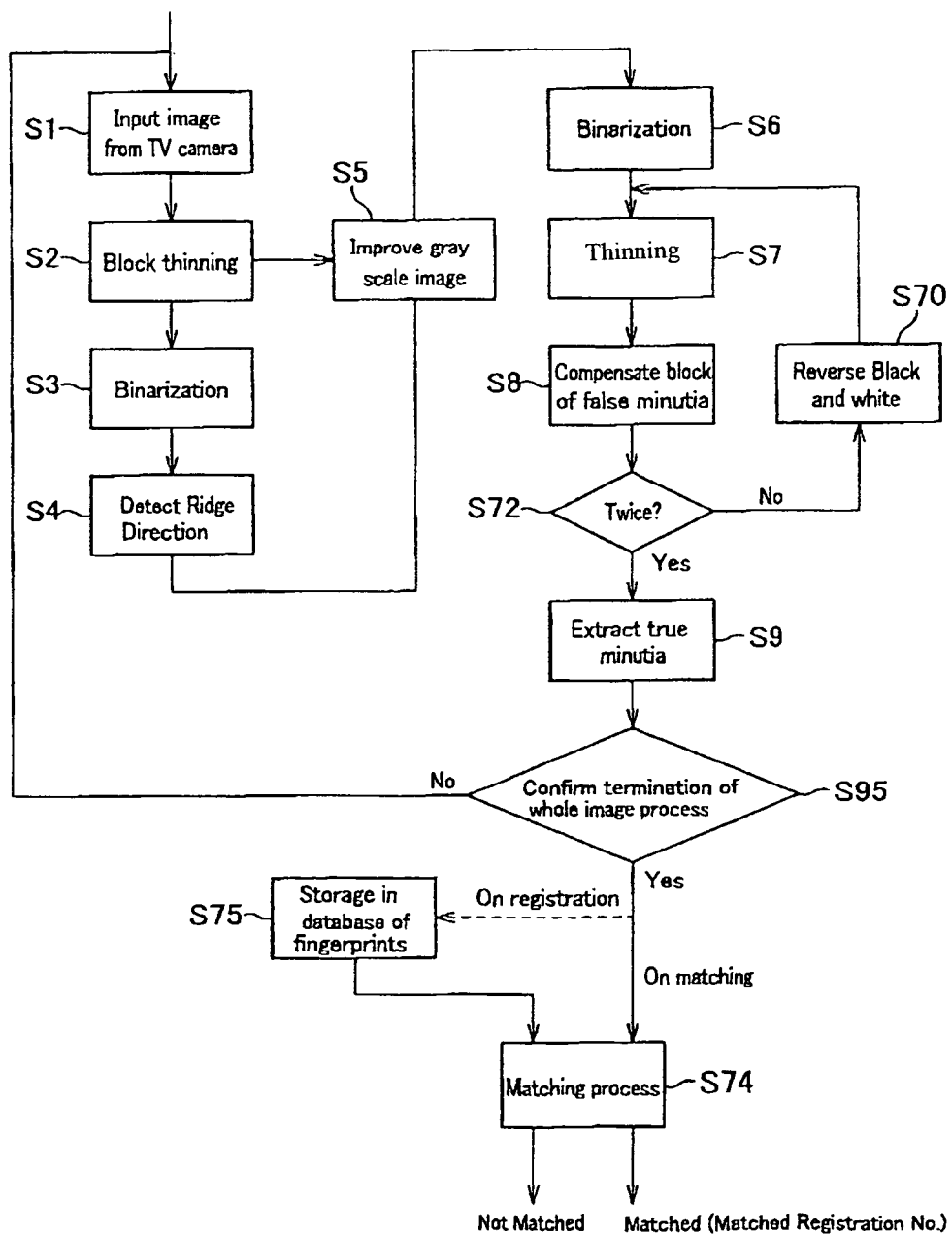
FIG. 13 illustrates an exemplary embodiment of an algorithm for finger authentication system of this invention.

FIG. 13 illustrates an algorithm for finger authentication system as an exemplary embodiment of this invention.

Processing from camera image input (Step S1) to true minutia extraction (Step S9) and then termination of whole image processing (Step S95) consists of partial algorithms explained with the reference to FIGS. 5, 6, 7, 8 and 9.

Block thinning (Step S2) after camera image input (Step S1) is always necessary in actual implementation, which leads to binarization (Step S3) and improvement of gray scale image (S5) for each partitioned block image.

When the result of the termination step of the whole image processing is "YES", the next step becomes either matching process (Step S74) or storage in the database of fingerprints (Step S75). In matching process (Step S74), the extracted feature data in the form of numerical data is used to compare with templates stored in the database of fingerprints.

In block processing, blocking noise is usually generated, which is seen as discontinuity of images on the boundary of blocks. The noise is eliminated by computer software. In order not to lose necessary information and to keep or capture information of whole image, boundary data of blocks overlap with data in adjacent blocks.

In this way, computer with ability of 1 million instructions per second performs a sequence of processing steps such as noise elimination of input fingerprint image, image improvement, binarization, thinning, elimination of false minutia and matching with database within 0.24 seconds by use of 40 to 60 bytes data for the extracted features.

Herein, improvement and various kinds of processing are explained in detail. Ridge direction is extracted from the fingerprint image before partitioning into blocks as shown in FIG. 6 and FIG. 13. Then, a directional filter, not shown in the figure, is used for the improvement of gray scale image (Step S5). When the fingerprint image is input to the directional filter, it is modified if a part of image is quite different from the ridge shape of the normal fingerprint. Modification is performed by computer, but it resembles such a human's action that contour of the ridge is redrawn by hand to make ridge image clearer.

Sophisticate software is implemented on the DSP. It is quite similar to such human's action where the parts to be modified are detected by eyes and modified by hand based on estimation derived from the ridge direction information around them.

Block thinning is a processing of each block, obtained by partitioning the raster scanned whole image into a rectangular array. It leads to unique processing by simplifying complex image processing, which is not suitable for computers. If width of a ridge is reduced to one pixel in size, the minutia ridge shape becomes a simple line connected to the minutia. It enables machine recognition with unique processing.

For those processing, the whole information for the block image is not stored in memory at the time. The local minutia 30, which is resistant against rotation, shifting and noise, and their associated chords 51, 52, 53, are extracted by local processing soon after block image is read, while the other raster scanned block images are not read during processing of the block. This process reduces required memory capacity.

Actual system configuration consists of a compact video camera and the DSP. Algorithm in this invention is stored as program in the DSP.

The 32×22 pixel image in each small block is selected from 200×200=40,000 pixels, which are a whole image input from the video camera in raster scan fashion. They are stored temporary in data memory of the DSP. By the described processing, information of minutia ridge shape is extracted as a numerical data based on the measure points 31, 32, 33, and 34 on the ridge 40.

Next, an input data of another block image is processed in the same way. Since it takes time to extract chords 51, 52, 53 as feature data, consecutive block image is not processed in the same frame. Since computer is busy to extract the minutia ridge shape information, it does not accept new input information during processing so as to save memory capacity.

Since each block processing can be performed independently of each other, 6 frames are input to cover whole image area under raster scan speed of 25 frame per second (corresponding to PAL or SECAM in Europe and Russia). In other words, a little bit more than ⅙ image data of each frame is input to the computer. Described overlapped image between adjacent blocks makes data size of each frame greater than ⅙ image data.

Since it takes at least about 0.24 seconds for the DSP to extract the minutia ridge shape information, whole image area cannot be covered by 1 frame raster scan input. 1 frame raster scanning takes similar time of ¹⁄₂₅ or ¹⁄₃₀ (NTSC in US and Japan) seconds. Therefore, during time of ⁶⁄₂₅ or ⁷⁄₃₀ seconds to scan 6 or 7 frames, consecutive operations, such as capture of the partitioned block image and processing of the image to final format as feature data, are repeated.

In practical application of the fingerprint authentication system, template data, which are also extracted feature data of fingerprint, is stored in advance in memory of the DSP or database in a host computer. Then, the input feature data is extracted as a sample from the input fingerprint image for verification. The data is compared with several templates registered in the database. By using criteria for verification, the system judges whether the input fingerprint is accepted or rejected by the system.

As a measure to evaluate the fingerprint authentication system, there are two kinds of measure, which are false acceptance ratio (referred to as FAR) and false rejection ratio (referred to as FRR). FAR is a ratio between falsely accepted samples (unregistered fingerprint) among many samples for verification. Ideal system requires that the FAR is zero. However, the zero FAR means the complete verification system, which may reject not only unregistered samples, but some of registered samples.

On the other hand, the FRR is a ratio between falsely rejected samples (registered fingerprints) among many samples for verification. In practical system, FRR and FAR are closely related with each other. Those values traded off by changing a threshold value, which is used to judge acceptance or rejection in verification. A score as a similarity measure is usually generated as a result of matching between input sample and registered template. If the higher threshold is set, the FAR becomes smaller, while the FRR becomes larger.

This invention succeeds to achieve the FRR less than 1.2% when the FAR is set to be zero. The result is compared with the world top data of 27.72%. This improvement also means the improvement of recognition ability against rotated, shifted and noisy input fingerprint images.

Extraction of 50 bytes feature data and verification in this invention is actually implemented on the DSP in speed of 1 million instructions per second. It takes 0.24 seconds for a sequence of processing such as noise elimination, image improvement, binarization, thinning and verification. This time shows greater improvement than conventional one in terms of speed and accuracy.

When this invention is used over networks to connect to an information center, which stores fingerprint feature templates, the system works as on-line personal authentication system accessed in remote.

The rule to authenticate registered person by logical operation such as AND, NAND, OR, and NOR of fingerprint feature data of plural fingers. For an example, the acceptance rule at home may be OR operation among fingerprints of thumbs of father, mother and all children. For another example, it may also be applicable to authentication of a car driver according to damage insurance for automobile accidents limited to drivers in family.

Since each person has 10 fingers, their combinations possess more variety than encryption. In addition to that, the ability to protect personal rights is increased more strongly than encryption. If the acceptance rule of AND operation of both thumb and baby fingers is adopted, its ability becomes tremendous.

Even if a new law in terms of electronic commerce in United States of America permits "encryption possesses equivalent lawful effect on signature", it is concluded as a usual and final decision in terms of personal authentication that fingerprint authentication will keep priority to encryption.

In summary, the present invention provides a curve recognition system and its application to fingerprint authentication based on ridge shape information, which achieves small size data format for curves on discrete grids, fast and accurate fingerprint authentication algorithm and hardware system with small data storages. Several important techniques are included in the system such as ridge shape of secondary points, true and false minutia detection, treatment of shifted and rotated input of fingerprint image, pipeline parallel processing for raster scan image capture and feature extraction processing, and several useful applications.

The system for fingerprint authentication of the present invention is used with terminal or stand-alone equipment, which posses a function such as search for personal history, key lock, issue of various tickets, access control and toll of gates, electric commerce, and fund management in medical, social welfare, service, public service, and financial organization. Preferably, the system for fingerprint authentication is embedded in hardware or software as a part of design data protection. To use the hardware or software requires personal authentication with fingerprints.

The invention claimed is:

1. A system for fingerprint authentication, comprising:
   a curve recognition system for storing, regenerating or matching a shape of a fingerprint ridge by using a specified group of data including one of a length, angle and position to express a shape of the ridge, wherein
   the curve recognition system uses a minutia and a sequence of several measure points on the fingerprint ridge selected so that chords connecting the adjacent measure points are of equal length, the shape of the fingerprint ridge is characterized by data of lengths of chords between a starting measure point and an ending measure point for every 3 consecutive measure points on the ridge.

2. The system as defined in claim 1, wherein the curve recognition system is provided for recognition of the ridge expressed on a discrete grid in the form of an array of pixels in a digital image, which determines position of the measure points by interpolating positions of two nearest adjacent pixels on the ridge, wherein the starting measure point divides a length of a chord between the two nearest adjacent pixels at the ratio of lengths from a standard pixel on the curve to each of the nearest adjacent pixels.

3. The system as defined in claim 1, further comprising in a sequence of processing:
   means for block partitioning to partition whole image data into plural pieces of blocks;
   means for the first binarization to make gray scale image a binary black and white image by enhancing contrast of original image;

means for deriving directions of the ridge in binary image;

means for noise elimination to eliminate black data not located along directions of ridge;

means for the second binarization to make gray scale image a binary data by enhancing contrast of original images;

means for thinning by reducing width of ridge until ridge width becomes one pixel in size;

means for false minutia elimination to eliminate plural minutiae located closely to each other, an ending minutia located near bifurcation minutia, a minutia located closely to image boundary, and an isolated minutia without ridge, and means for extracting minutia to adopt remaining minutia as true minutia after above false minutia elimination.

4. The system as defined in claim 3, further including two kinds of extraction means for an ending minutia performed using the original black and white image and an inverted version of the original black and white image, instead of extracting both ending and bifurcation minutia using just the original black and white image.

5. The system as defined in claim 1, wherein the system utilizes, as an additional feature of fingerprints, both the ridge shape and the ridge shape of a secondary minutia, whose position is determined in association with each minutia.

6. The system as defined in claim 1, further including a cost effective calculation for judging true or false minutia, comprising:

means for taking two-dimension coordinates with respect to an origin located at a bifurcation point;

means for taking 3 points on different ridges leaving from the bifurcation point with the same distances from the bifurcation point;

means for calculating inner products of all pairs of point-vectors that can be obtained from the 3 point-vector that correspond, respectively, to the 3 points;

means for judging the bifurcation as a false bifurcation minutia if all calculated inner products are less than a specified value, and, otherwise, judging the bifurcation as a true bifurcation minutia; and means for judging ridge ending as a false ending minutia by using the inner products over valleys if all inner products are less than a specified value, and, otherwise, judging the ending minutia as a true ending minutia.

7. The system as defined in claim 1, wherein different parts of the fingerprint image are processed in a way to generate numerical data for each frame input of the fingerprint image and processing of a whole fingerprint image is completed for plural frame inputs of the fingerprint image.

8. The system as defined in claim 7, wherein the system takes $6^{th}$ frame in a raster scan system of 25 frames per second to complete processing from image capture to numerical processing, which corresponds to input time of 6 or 7 frames.

9. The system as defined in claim 8, further comprising:

means for rotating coordinates of all minutiae to a rotation angle around a specified origin point;

means for compensating a minutia ridge shape for rotation to the rotation angle; and means for employing fingerprint matching without compensation for displacement of fingerprints.

10. The system as defined in claim 1, comprising:

means for extracting numerical data of the fingerprint ridge shapes of the ridge leaving from the minutia; and means for matching the numerical data with template samples registered in advance in a fingerprint database.

11. The system as defined in claim 1, wherein a computer performs a sequence of processing including thinning, compensation, binarization, thinning, collection and matching of fingerprint feature data expressed by 40 or 60 bytes data in size.

12. The system as defined in claim 1, further comprising:

means for extracting fingerprint feature data of 40 or 60 bytes from a fingerprint template transferred from an outer device or terminal equipment; and means for transferring result of matching with the templates through communication network to the outer device or terminal equipment.

13. The system as defined in claim 1, wherein the system is used with one of a terminal or stand-alone equipment for personal history, a key lock, an issue of various tickets, an access control and toll of gates, electric commerce, and a fund management in medical, social welfare, service, public service, and financial organization.

14. The system as defined in claim 1, wherein the system is embedded in hardware or software as a part of design data protection, and wherein use of the hardware or software requires personal authentication with fingerprints.

15. The system as defined in claim 1, wherein a criterion of acceptance is determined by logic operations performed on or utilizing extracted feature data of plural fingerprints.

* * * * *